May 16, 1944.   C. A. MEYER   2,349,187
VIBRATION DAMPENER
Filed March 8, 1941

WITNESSES:
James X. Mosser
Andrew J. Cook

INVENTOR
CHARLES A. MEYER.
BY A. B. Reavis
ATTORNEY

Patented May 16, 1944

2,349,187

UNITED STATES PATENT OFFICE 2,349,187

VIBRATION DAMPENER

Charles A. Meyer, Drexel Hill, Pa., assignor to Westinghouse Electric & Manufacturing Company, East Pittsburgh, Pa., a corporation of Pennsylvania Application March 8, 1941, Serial No. 382,320

4 Claims. (Cl. 253—77)

The invention relates to damping of an angularly movable body subject to vibration and it has for an object to provide improved means for this purpose.

A more particular object of the invention is to damp an angularly movable body, such as a turbine blade, by means comprising a cavity formed in the body and having a concave seat facing the axis of movement of the body together with a roller and a suitable damping liquid in the cavity, the roller having a radius which is less than that of the seat.

These and other objects are effected by the invention as will be apparent from the following description and claims taken in connection with the accompanying drawing forming a part of this application, in which:

Figure 3:
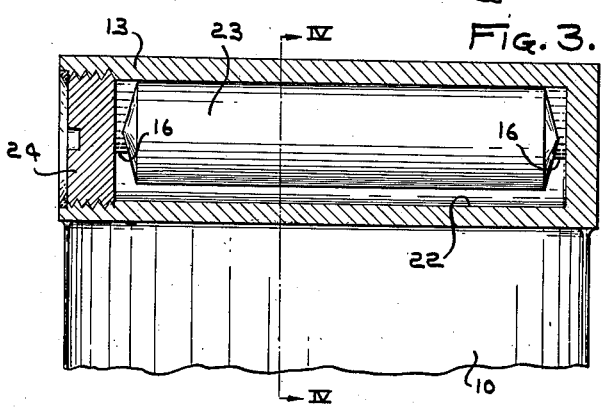
Figure 5:
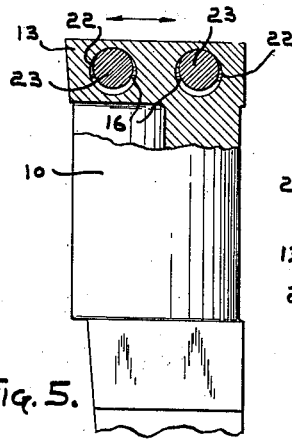
Figure 6:
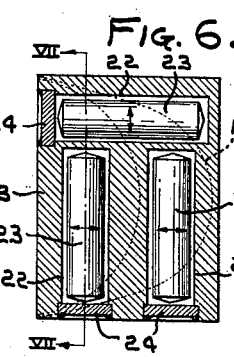
Figure 4:
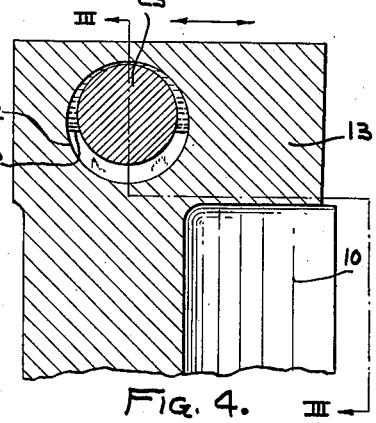
Figure 7:
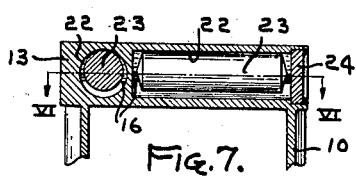

Figs. 3 and 4 are views showing the modified and preferred form of cylindrical damper, Figs. 3 and 4 being sectional views taken along the lines III—III and IV—IV of Figs. 4 and 3, respectively;

Fig. 5 is a fragmentary sectional view of a portion of a turbine blade showing a plurality of dampers applied thereto; and, Figs. 6 and 7 are sectional views of blade shroud members each having dampers effective at right angles.

In the drawing, a body, such as a turbine blade 10, is movable about the turbine rotor axis and, in operation, it is subject to vibration.

The means for damping vibration comprises a cavity 12 formed in any suitable part of the blade, for example, the shroud 13, and having a concave seat 14 facing the turbine rotor axis. The cavity contains a loose body 15 and a damping medium 16 of suitable viscosity, the body having a curved surface 17 for cooperation with the seat and having a radius which is less than that of the latter.

Figure 1:
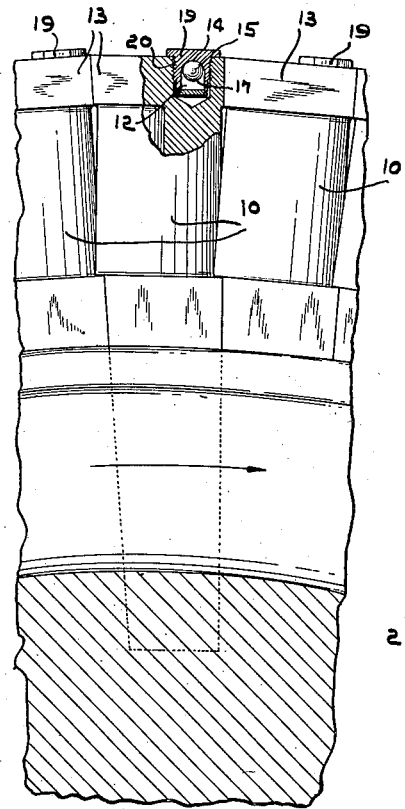
Fig. 1 is a fragmentary view showing a turbine blade with the improved ball damper applied thereto.
Figure 2:
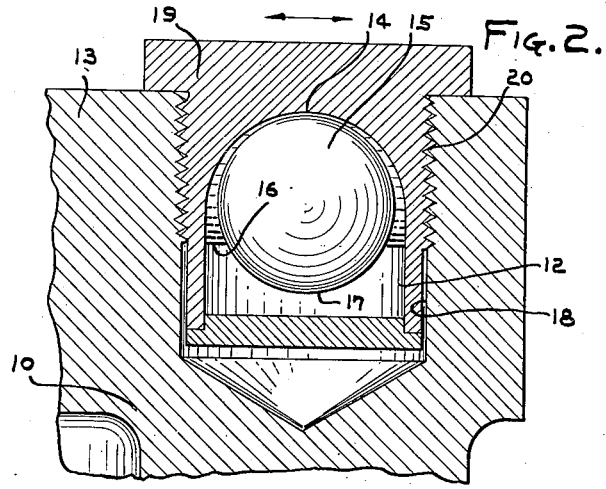
Fig. 2 is an enlarged view of the spherical damper shown in Fig. 1.

In Figs. 1 and 2, the cavity is provided by a radial bore 18 formed in the blade 10 and a closure 19 is secured in the outer end of the bore. The closure is provided with the seat 14. In these views, the seat 14 is spherical and the body 15 takes the form of a ball. The closure 19 is held in place by any suitable fastening means, for example, the threaded connection 20.

In Fig. 3, the cavity 12 is provided by a cylindrical bore 22 arranged parallel to the turbine axis and having a cylindrical roller 23 therein, one end of the bore being closed by a plug 24.

The ball or roller rolls on the seat and the frequency depends upon the difference in radius of the seat and the ball or roller, the radius of the latter being smaller than that of the former. For optimum damping, the ball or roller should be designed to have a frequency approximately equal to the blade natural frequency, and the damping fluid should have a viscosity which will act to the best advantage.

Any suitable fluid for damping movement of the ball or roller may be used, so long as it has sufficient viscosity to serve its purpose effectively. As a turbine blade is subject to relatively high temperatures, the damping medium must take this into account, and it is found that heat-treating salts, for example, a mixture composed of 50 per cent potassium nitrate, 6 per cent potassium nitrite, and 44 per cent sodium nitrate, provide an effective damping liquid at elevated temperatures.

Due to the fact that it is difficult to predict accurately the natural frequency of turbine blades, because of uncertainties in the stiffness of the root fastening, two or more dampers of the type described may be incorporated in a blade, and each ball or roller can be designed with a different natural frequency, so that there will be allowance for miscalculation or changing of blade frequency due to any cause such as heating. Accordingly, in Fig. 5, there is shown an enlarged portion of a turbine blade having two dampers serving this purpose.

If desired, as shown in Figs. 6 and 7, a blade shroud portion 13 may incorporate damping rollers effective at right angles.

From the foregoing, it will be apparent that each vibratory body, that is, a turbine blade or its equivalent, constitutes a main vibration system and there is associated therewith an auxiliary vibration system, the latter being comprised by a concave seat carried by the body and with which cooperates a ball or roller subject to a force field, the plane of vibration of the body, the direction of the force field and the concave seat having such relation that movement of the ball or roller from a central position on the seat in either direction occurs against the force field with the result that the latter tends to restore the ball or roller to its central position. Hence, the concave seat and the ball or roller constitutes an auxiliary vibration system whose frequency is made equal to or approximately equal to the natural frequency of the body, and liquid in the cavity provides damping between the auxiliary and main systems.

While the invention has been shown in several forms, it will be obvious to those skilled in the art that it is not so limited, but is susceptible of various other changes and modifications without departing from the spirit thereof, and I desire, therefore, that only such limitations shall be placed thereupon as are specifically set forth in the appended claims.

What is claimed is:

1. In combination, a blade carried by rotor structure and extending radially with respect to the axis of rotation of the latter, and means for damping vibrations of the blade; said damping means comprising a cavity formed in the outer end portion of the blade and provided with a concave seat facing the axis of rotation, a roller of less radius than that of the seat and cooperating with the latter, and damping medium in the cavity and cooperating with the roller and the seat to provide damping between the roller and the blade.

2. The combination as claimed in claim 1 wherein the frequency of the damping means is of the order of the natural frequency of the blade.

3. The combination as claimed in claim 1 wherein the medium is a liquid.

4. The combination as claimed in claim 1 wherein the seat is cylindrically concave and the roller is cylindrical.

CHARLES A. MEYER.